United States Patent
Wu et al.

(10) Patent No.: US 8,290,296 B2
(45) Date of Patent: Oct. 16, 2012

(54) SYSTEM AND METHOD FOR DETECTING BLEMISHES IN AN IMAGE CAPTURED BY AN ELECTRONIC DEVICE

(75) Inventors: Wen-Yi Wu, Shenzhen (CN); Qing-Hua Liu, Shenzhen (CN); Yong-Hui Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 455 days.

(21) Appl. No.: 12/629,601

(22) Filed: Dec. 2, 2009

(65) Prior Publication Data
US 2011/0026823 A1 Feb. 3, 2011

(30) Foreign Application Priority Data
Jul. 31, 2009 (CN) .......................... 2009 1 0305090

(51) Int. Cl.
G06K 9/40 (2006.01)
G06K 9/62 (2006.01)
G06K 9/00 (2006.01)

(52) U.S. Cl. .................. 382/275; 382/224; 382/141

(58) Field of Classification Search .................. 382/275
See application file for complete search history.

(56) References Cited

U.S. PATENT DOCUMENTS

| | | | | | |
|---|---|---|---|---|---|
| 4,606,635 | A | * | 8/1986 | Miyazawa et al. | 356/240.1 |
| 5,267,328 | A | * | 11/1993 | Gouge | 382/128 |
| 5,272,762 | A | * | 12/1993 | Sezaki et al. | 382/147 |
| 5,671,264 | A | * | 9/1997 | Florent et al. | 378/98 |
| 6,014,474 | A | * | 1/2000 | Takeo et al. | 382/308 |
| 6,104,839 | A | * | 8/2000 | Cok et al. | 382/254 |
| 6,507,675 | B1 | * | 1/2003 | Lee et al. | 382/266 |
| 6,658,143 | B2 | * | 12/2003 | Hansen et al. | 382/133 |
| 6,731,806 | B1 | * | 5/2004 | Gindele | 382/205 |
| 7,251,348 | B2 | * | 7/2007 | Hatakeyama et al. | 382/109 |
| 2003/0012452 | A1 | * | 1/2003 | Trifonov et al. | 382/275 |
| 2009/0116727 | A1 | * | 5/2009 | Jin et al. | 382/149 |

* cited by examiner

*Primary Examiner* — David Zarka
(74) *Attorney, Agent, or Firm* — Altis Law Group, Inc.

(57) ABSTRACT

A method for detecting blemishes in a RGB image captured by an electronic device includes following steps. The image is read from the electronic device. A center point of the image is defined. Pixels of radials radiating from the center point of the image are detected for detecting blemishes in the image. Blemishes in the image are counted. A total blemish number is compared with a maximum tolerable blemish number. If the total blemish number in the image exceeds the maximum tolerable blemish number, displaying test failure; and if the total blemish number in the image does not exceeds the maximum tolerable number, displaying test pass. A blemish detection system associated with the method is also disclosed.

8 Claims, 7 Drawing Sheets

SYSTEM AND METHOD FOR DETECTING BLEMISHES IN AN IMAGE CAPTURED BY AN ELECTRONIC DEVICE

BACKGROUND

1. Technical Field

The present disclosure relates to a system and method for detecting blemishes in an image captured by an electronic device.

2. Description of Related Art

Nowadays, more and more electronic devices, (e.g., digital cameras, cell phones, PDAs, notebook computers) have image capture modules to capture images. It's a necessary step to detect blemishes in the images captured by the electronic devices to ensure that the image capture function of the electronic device is qualified.

In the camera manufacturing, special methods are needed to detect blemishes in images captured by the camera. The blemishes are difficult to detect accurately, but on the other hand, they cause a significant reduction in camera quality. A typical method is manually detecting blemishes number in the image captured by the camera of the electronic device or utilizing test software to test a blemishes density in the image. However, the typical methods are not accurate in detection of blemishes.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
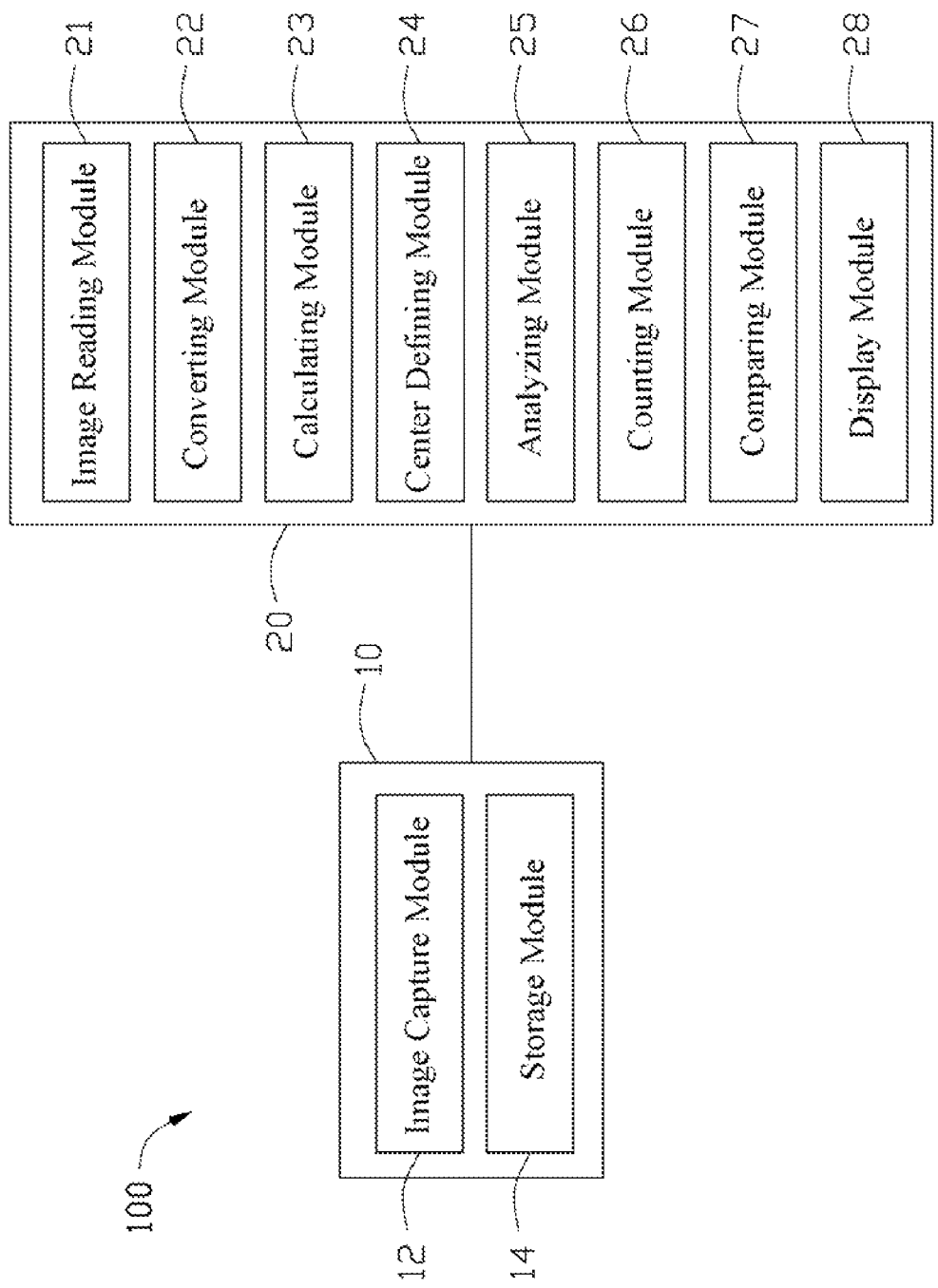
FIG. 1 is a block diagram of system for detecting blemishes in an image captured by an electronic device.

Referring to FIG. 1, a blemish detection system 100 includes an electronic device 10 and a test device 20. The electronic device 10 includes an image capture module 12 capable of taking an RGB (Red-Green-Blue) image and a storage module 14 for storing the image. The test device 20 is capable of detecting blemishes occurring in the image.

The test device 20 includes an image reading module 21 capable of reading the image from the image capture device, a converting module 22 capable of converting the RGB image into grayscale, a calculating module 23 capable of processing pixel values (RGB pixel values or grey pixel values) of the image, a center defining module 24 capable defining a center point of the image, an analyzing module 25 capable of analyzing pixels of the image for detecting blemishes in the image, a counting module 26 capable of taking count of blemishes in the image, a comparing module 27 capable of comparing a total blemish number with a maximum tolerable blemish number, and a display module 28 capable of outputting a test result indication of test failure if the total blemish number in the image exceeds the maximum tolerable blemish number or outputting a test result indication of test pass if the total blemish number in the image does not exceeds the maximum tolerable blemish number.

Figure 2:
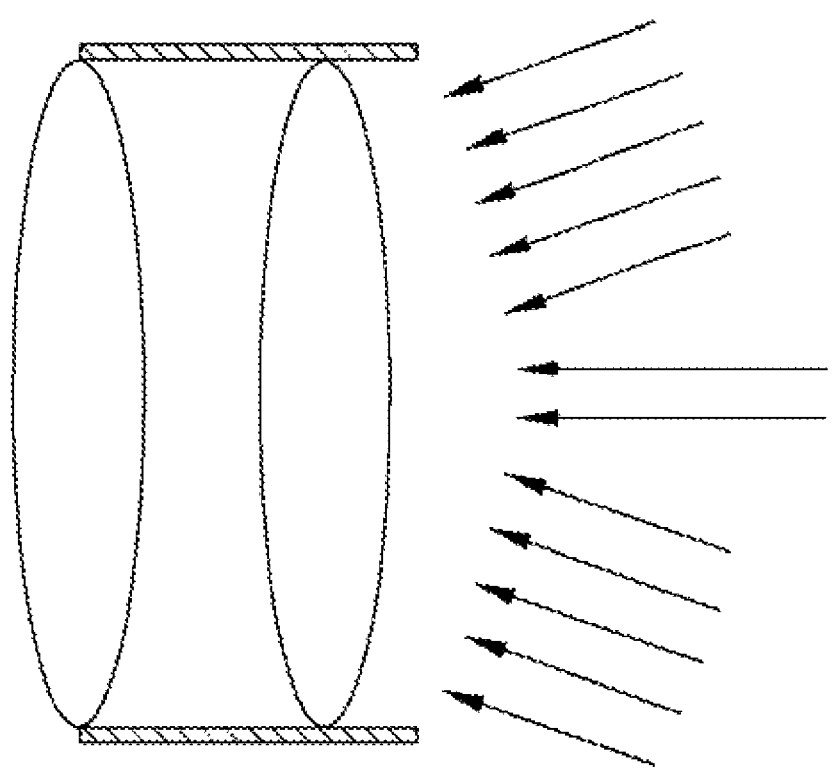
FIG. 2 illustrate how light typically enters a camera lens of the electronic device.

Referring to FIG. 2, when the electronic device 10 capture an image, an amount of light from a light source box (not shown) enters the camera lens of the image capture module 12 of electronic device 10. The light that enters to a central portion of the camera lens is stronger than that the light that enters from an outer portion of the camera lens due to effect of enclosure structures of the electronic device 10 and the light source box.

Figure 3:
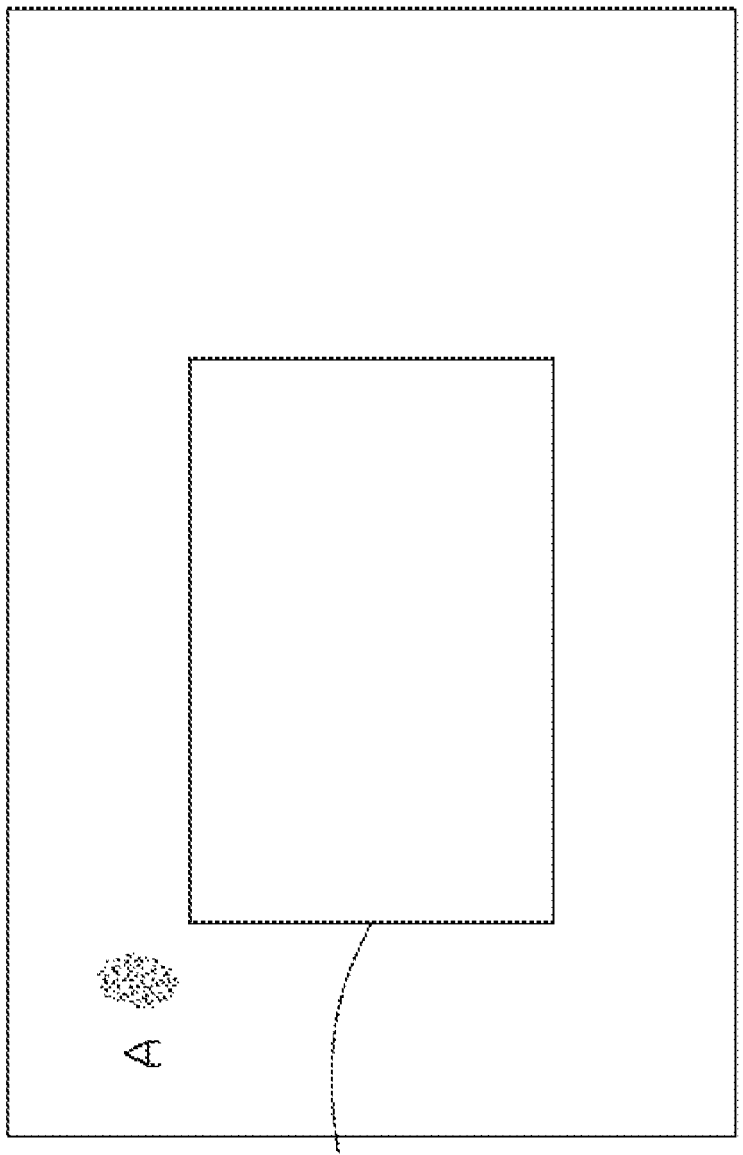
FIG. 3 illustrates a rectangle finder movable on an image captured by the electronic device.

Referring to FIG. 3, the center defining module 24 is capable of utilizing a rectangle finder 241 that is moveable on the image. A width of the rectangle finder 241 can be half of that of the image, and a length of the rectangle finder can be half of that of the image. The calculating module 23 is capable of calculating an average pixel value of each rectangle area where the rectangle finder 241 has reached. The center defining module 24 is configured to select a rectangle area with a maximum average pixel value in the image and defines a center of the selected rectangle area as the center point of the image.

Figure 4:
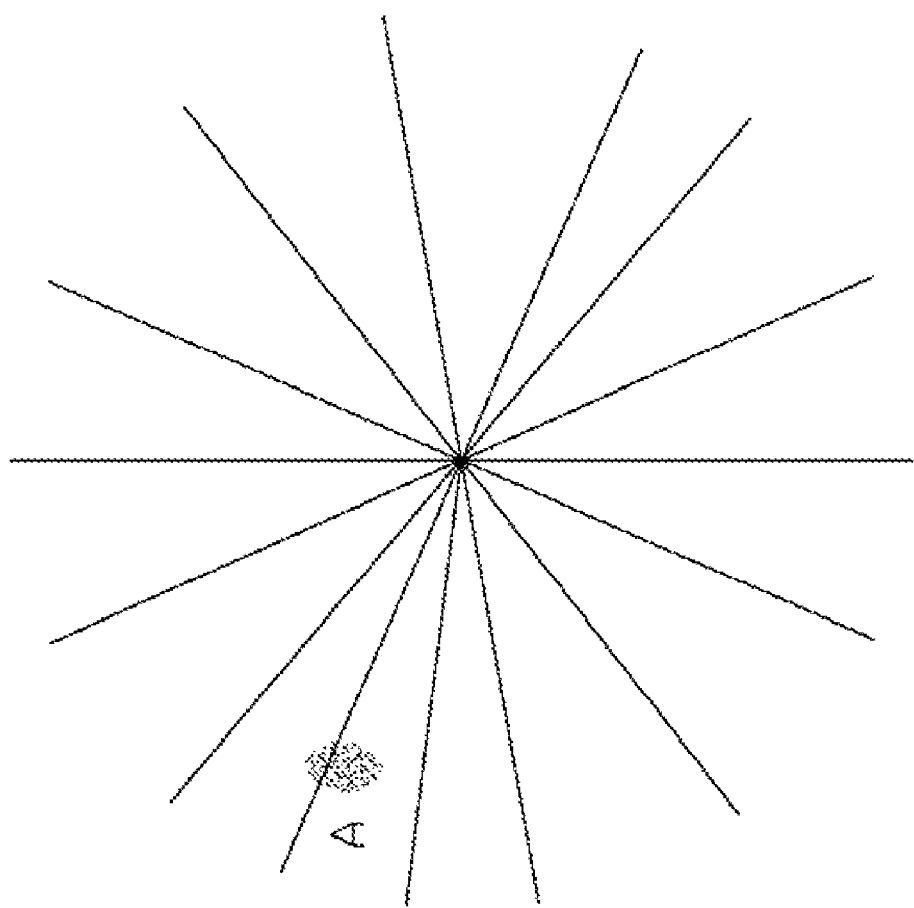
FIG. 4 illustrates radials radiating from a center point of the image captured by the electronic device.
Figure 5:
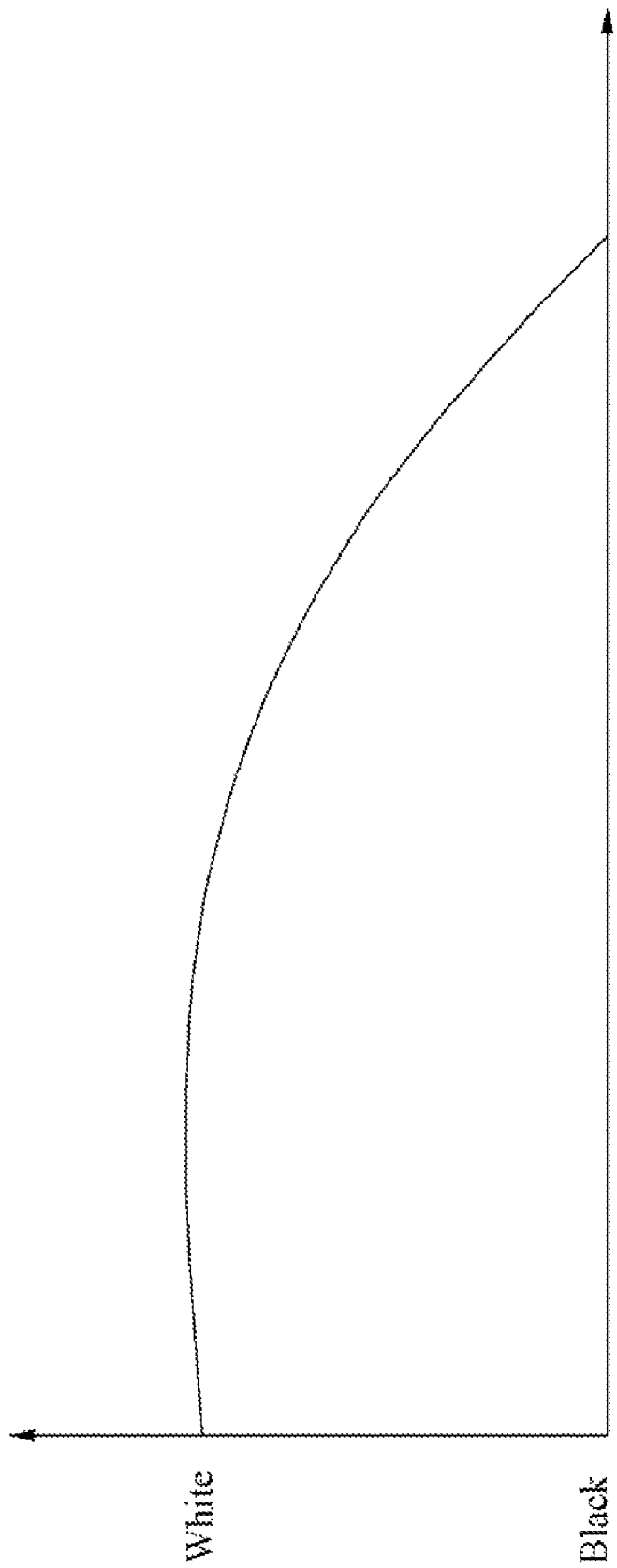
FIG. 5 illustrates a trend of one of the radials without any blemish.
Figure 6:
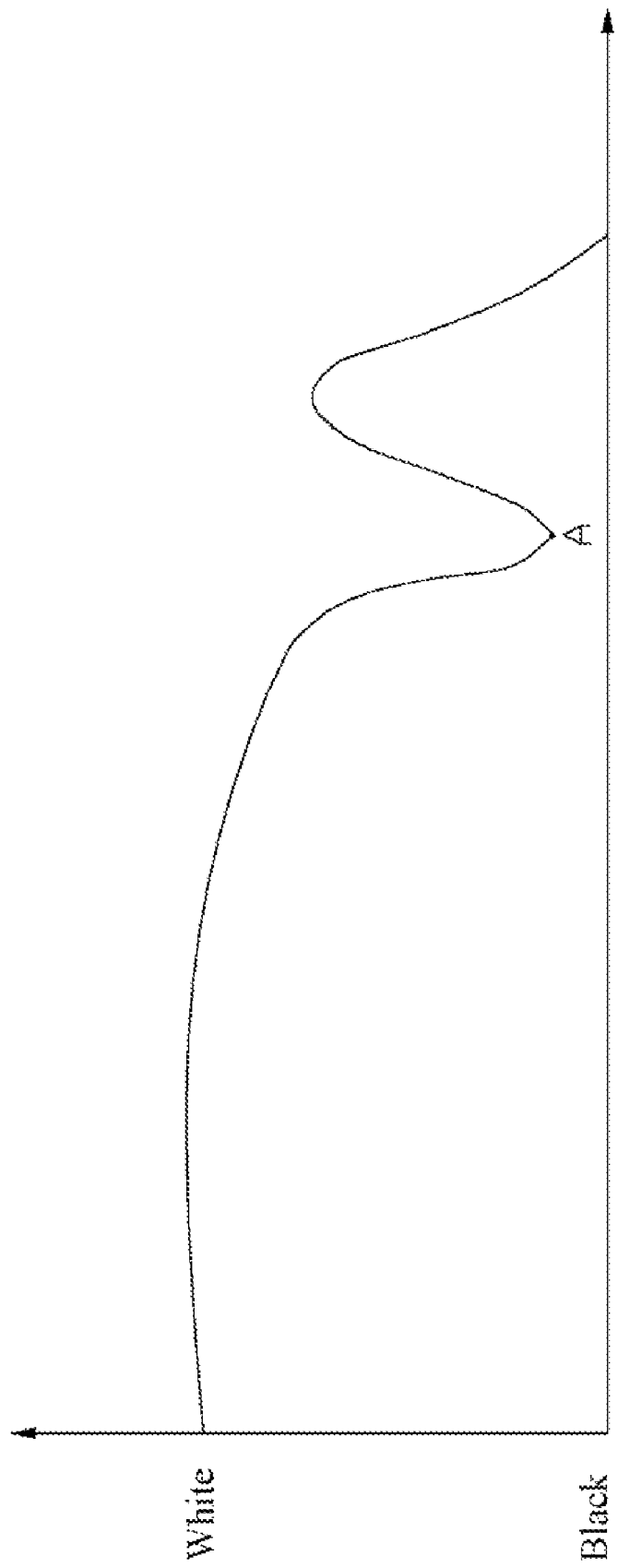
FIG. 6 illustrate a trend of one of the radials with a blemish.

Referring to FIGS. 4-6, FIG. 4 illustrates radials radiating from the center point of the image. One of the radials contains a blemish A. The radial without any blemish can be presented as a smooth curve (See FIG. 5), where the radial from the center point become darker as the distance increases until becoming black (0). The radial with a blemish can be presented as a curve that has a sudden change that is labeled with A (See FIG. 6), A deviates from a trend of pixel values of the radial and considered as a blemish.

Figure 7:
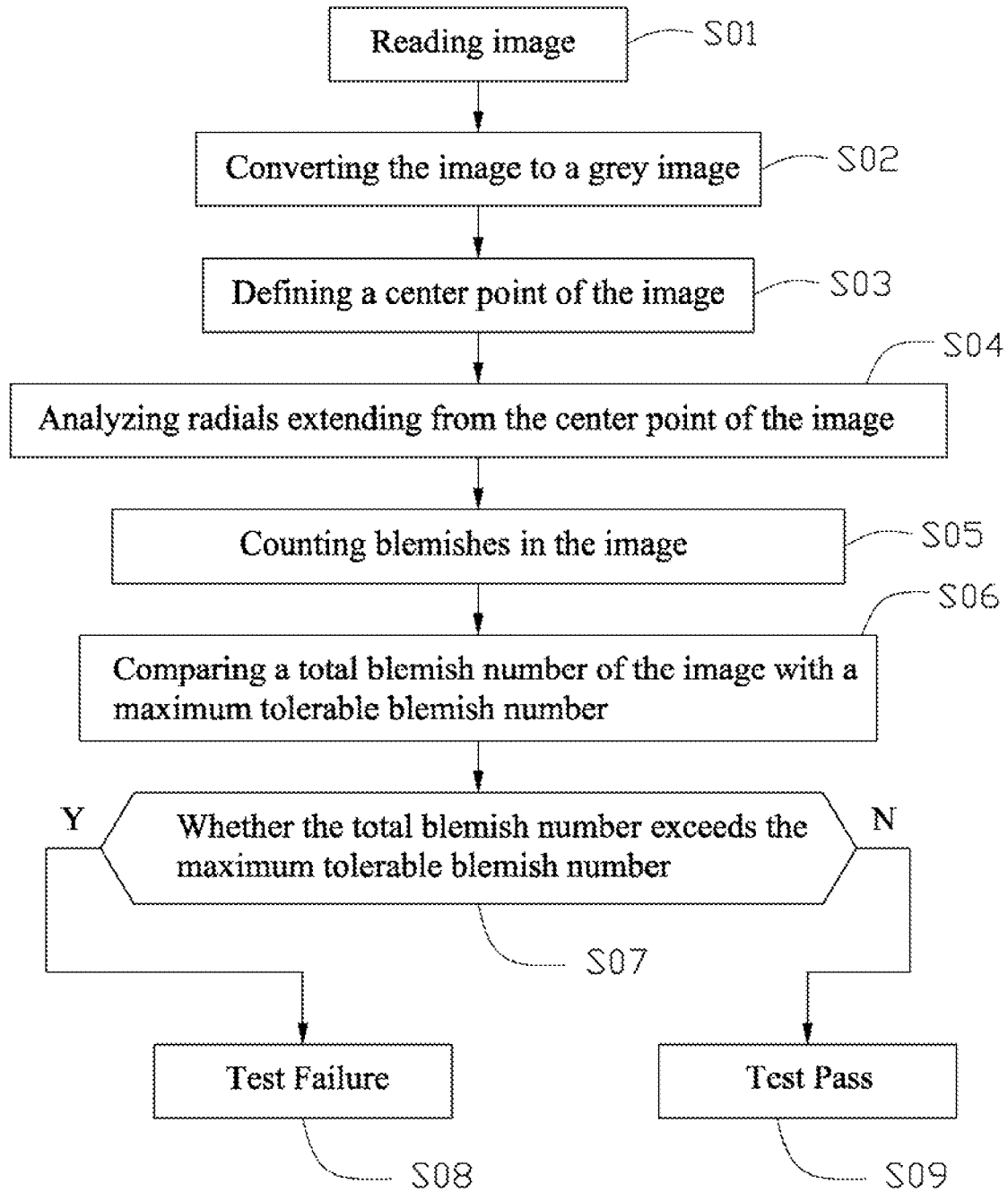
FIG. 7 is a flow chart of method for detecting blemishes in an image captured by an electronic device.

Referring to FIG. 7, a blemish detection method, according to one embodiment, associated with the blemish detection system comprises following blocks.

In block S01, the image reading module 21 reads the image from the electronic device.

In block S02, the converting module 22 converts the image to a grey image.

In block S03, the center defining module 24 defines a center point of the image. In this block, the center defining module 24 utilizes the rectangle finder 241 moving on the grey image, and an average grey value of each rectangle area where the rectangle finder 241 has reached is calculated by the calculated module 23. In the embodiment, the center defining module 24 utilizes the finder 241 to select a rectangle area with a maximum average grey value in the image and defines a center of the selected area as the center point of the image.

In block S04, the analyzing module 25 analyzes radials extending from the center point of the image to the perimeter of the image In some embodiments, a density of the radials extending from the center point of image is predetermined. The higher the density is, the more accurate the detection result is. In this block, the analyzing module 25 reads pixel values of each radial and determines whether there is a sudden change in a trend of the pixel values of each radial. If there is a sudden change in the trend of the pixel values of one radial, the radial is considered to have a blemish.

In block S05, the counting module 26 takes count of blemishes in the image.

In block S06, the comparing module 27 compares a total blemish number of the image with a maximum tolerable blemish number (such as five).

In block S07, whether the total blemish number exceeds the maximum tolerable blemish number is determined.

In block S08, if the total blemish number in the image exceeds the maximum tolerable blemish number, the displaying module 28 displays an indication of test failure.

In block S09, if the total blemish number in the image does not exceeds the maximum tolerable number, the displaying module 28 displays an indication of test pass.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

Depending on the embodiment, certain of the steps of the methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for detecting blemishes in a RGB image captured by an electronic device, the method comprising steps of:
    reading the RGB image from the electronic device;
    converting the RGB image to a grey image and measuring a length and a width of the grey image;
    defining a center point of the RGB image by moving a rectangle finder on the grey image and calculating an average grey value of each area framed by the rectangle finder;
    analyzing pixels of each radial radiating from the center point of the RGB image for detecting blemishes in the RGB image;
    taking count of blemishes in the RGB image;
    comparing a total blemish number with a maximum tolerable blemish number;
    if the total blemish number in the RGB image exceeds the maximum tolerable blemish number, displaying an indication of test failure; and
    if the total blemish number in the RGB image does not exceeds the maximum tolerable number, displaying an indication of test pass;
    wherein a blemish is a change in a trend of the pixel values along each radial.

2. The method of claim 1, wherein the step of defining the center point of the RGB image further comprises selecting a rectangular area with a maximum average grey value in the grey image and defining a center of the rectangular area with the maximum average grey value as the center point of the grey image.

3. The method of claim 1, wherein the rectangle finder has a width equals to half of the width of the grey image, the rectangle finder has a length equal to half of the length of the grey image.

4. The method of claim 1, wherein the step of analyzing each radial from the center point of the RGB image comprising reading pixel values of each radial and determining whether there is a change in a trend of the pixel values along each radial.

5. A blemish detection system comprising:
    an image capturing device configured to capture a RGB image within RGB pixels;
    a detection device capable of detecting blemishes in the RGB image, the detection unit comprising:
        an image reading module capable of reading the RGB image from the image capture device;
        a center defining module capable of defining a center point of the RGB image;
        an analyzing module capable of analyzing pixels of each radial radiating from the center point of the RGB image for detecting blemishes in the RGB image, wherein a blemish is a change in a trend of the pixel values along each radial;
        a counting module capable of taking count of blemishes in the RGB image;
        a comparing module capable of comparing a total blemish number with a maximum tolerable blemish number;
        a display module capable of outputting a test result of test failure if the total blemish number in the RGB image exceeds the maximum tolerable blemish number and outputting a test result of test pass if the total blemish number in the RGB image does not exceeds the maximum tolerable blemish number; and
        a calculating module capable of calculating grey values corresponding to RGB pixels of the RGB image and averaging the grey values;
    wherein the center defining module is capable of selecting a rectangular area with a maximum average grey value and defining a center of the rectangular area with the maximum average grey value as the center point of the RGB image.

6. The blemish detection system of claim 5, further comprising a converting module capable of converting the RGB image into a grey image after calculating the grey values of the RGB image.

7. A blemish detection system comprising:
    an image capturing device configured to capture a RGB image within RGB pixels; and
    a detection device capable of detecting blemishes in the RGB image, the detection unit comprising:
        an image reading module capable of reading the RGB image from the image capture device;
        a center defining module capable of defining a center point of the RGB image by moving a rectangle finder on the RGB image to select a rectangular area with a maximum average grey value and by defining the center of the rectangular area with the maximum average grey value as the center point of the RGB image;
        an analyzing module capable of analyzing pixels of each radial radiating from the center point of the RGB image for detecting blemishes in the RGB image, wherein a blemish is a change in a trend of the pixel values along the radial.

8. The blemish detection system of claim 7, wherein the rectangle finder has a width equals to half of a width of the RGB image, the rectangle finder has a length equals to half of a length of the RGB image.

* * * * *